United States Patent

Nishikawa et al.

Patent Number: 5,219,425
Date of Patent: Jun. 15, 1993

[54] FLUX CONTAINING WIRE FOR USE IN STAINLESS STEEL WELDING

[75] Inventors: Yutaka Nishikawa; Tsuneshi Ogawa, both of Fujisawa; Tsuyoshi Kurokawa, Chigasaki; Toshiharu Maruyama, Kamakura, all of Japan

[73] Assignee: Kabushiki Kaisha Kobe Seiko Sho, Kobe, Japan

[21] Appl. No.: 948,471

[22] Filed: Sep. 22, 1992

Related U.S. Application Data

[63] Continuation of Ser. No. 563,329, Aug. 7, 1990, abandoned.

[30] Foreign Application Priority Data

Aug. 25, 1989 [JP] Japan ................................. 1-218844

[51] Int. Cl.⁵ .............................................. B23K 35/22
[52] U.S. Cl. ............................ 228/56.3; 219/145.22
[58] Field of Search ........................ 228/56.3, 224; 219/145.11, 146.31

[56] References Cited

U.S. PATENT DOCUMENTS

| | | |
|---|---|---|
| 3,405,248 | 10/1968 | Essers et al. |
| 4,282,420 | 8/1981 | Banks .......................... 219/145.22 |
| 4,314,136 | 2/1982 | Kotecki . |
| 4,366,364 | 12/1982 | Arai et al. ................... 219/145.22 |
| 4,510,374 | 4/1985 | Kobayashi ................... 219/146.24 |
| 4,723,061 | 2/1988 | Mung ............................ 219/146.24 |

FOREIGN PATENT DOCUMENTS

| | | |
|---|---|---|
| 56-109192 | 8/1981 | Japan . |
| 59-212192 | 12/1984 | Japan . |
| 60-203397 | 10/1985 | Japan . |
| 1212499 | 9/1986 | Japan ..................... 219/145.22 |
| 63-220996 | 9/1988 | Japan . |
| 1-284497 | 11/1989 | Japan ..................... 219/145.22 |
| 2-099297 | 4/1990 | Japan ..................... 219/145.22 |
| 2-179362 | 7/1990 | Japan ..................... 219/145.22 |

Primary Examiner—Richard K. Seidel
Assistant Examiner—James Miner
Attorney, Agent, or Firm—Oblon, Spivak, McClelland, Maier & Neustadt

[57] ABSTRACT

Described herein is a flux containing wire for use in stainless steel welding, the wire having a flux filled in a stainless steel sheath, the flux containing, on the basis of the total weight of the wire, 4.7–8.5% of $TiO_2$, 0.5–3.5% of $Al_2O_3$ and 0.6–3.0% of $SiO_2$ and/or $ZrO_2$ in proportions satisfying the following formula $$TiO_2 > Al_2O_3 + SiO_2 + ZrO_2$$

and further 0.02–0.25% of metal fluoride (in terms of F conversion value) and 0.1–1.0% of Ti. Desirably, the flux contains slag-forming components in a restricted range of 8.5–13.5% and in proportions satisfying the following formula $$Al_2O_3 + SiO_2 + ZrO_2 \leq 5.0\%.$$

9 Claims, 1 Drawing Sheet

FLUX CONTAINING WIRE FOR USE IN STAINLESS STEEL WELDING

This application is a continuation of application Ser. No. 07/563,329, filed on Aug. 7, 1990, now abandoned.

BACKGROUND OF THE INVENTION

1. Field of the Invention

This invention relates to a flux containing cored wire suitable for use in stainless steel welding, and more particularly to a flux cored wire which is applicable to welding operations in all positions under the same conditions including not only downhand, sideward, vertical and horizontal fillet welding operations but also overhead welding operations, and which is capable of forming a weld metal with excellent characteristics in terms of welding operation and X-ray property.

2. Prior Art

Because of handiness coupled with high efficiency and quality, the demand for flux cored wires (FCW) has been lately on a keen increase even in stainless steel welding processes. However, heretofore their applications have been restricted mostly to downhand and horizontal fillet welding operations and to part of welding operations in horizontal and vertical positions, finding almost no applications in operations in the overhead position.

More specifically, the stainless steels which have lower heat conductivity and solidification temperature as compared with carbon steels require higher welding techniques in the horizontal and vertical welding position which are more susceptible to dribbling of molten metal than the downhand welding position. Especially in the overhead welding, it has been difficult to obtain satisfactory X-ray property even by the use of specially designed power source and shielding gas.

Under these circumstances, various attempts have been made to meet the increasing demand for a flux cored wire which permits all-position welding. For example, flux cored wires of this sort are proposed in Japanese Patent Publication 59-15757 and Japanese Laid-Open Patent Application 59-212192.

The first mentioned Japanese Patent Publication 59-15757 describes a wire which is intended mainly for horizontal and vertical position welding, while the Japanese Laid-Open Patent Application 59-212192 discloses a flux cored wire which is applicable to welding operations in all of the downhand, horizontal and vertical positions although the welding condition differs greatly between the downhand and vertical positions. Besides, both of these prior art wires require low current welding condition in the vertical position as compared with the downhand position. Accordingly, in a case where a welding operation involves all welding positions in its sequence, it becomes necessary to use different wires in the downhand and vertical (or horizontal) positions or to use a wire under different conditions. More specifically, it becomes necessary to use in the vertical welding position a current which is about 50% lower than in the downhand welding position despite a material drop in efficiency, and the necessity of weaving makes it difficult to obtain beads with short legs, coupled with a problem that the wire is applicable only to plates having a thickness greater than 5 mm and not to plates of smaller thicknesses. In addition, in case of downward welding in the vertical position, the operation is often rendered infeasible by instable arc condition and dribbling of molten metal which destabilizes the molten pool.

Thus, owing to the problems arising in controlling welding operations or problems of efficiency in the vertical position welding, the conventional flux cored wires (FCW) have found only restricted applications, and therefore overhead welding operations have thus far relied on the covered arc welding or TIG welding without application of FCW.

SUMMARY OF THE INVENTION

In view of these situations, the present invention has as its object the provision of a flux cored wire for use in stainless steel welding, which can be used in all welding positions including the overhead position with improved operability and under the same conditions and which can form a weld metal of sound properties including X-ray property and so forth.

Conventional flux cored wires intended for use in stainless steel welding in most cases employ a flux of the $TiO_2$-$SiO_2$-$ZrO_2$ system which is added with suitable amounts of $Al_2O_3$, MgO, MnO and the like for adjustment of viscosity and slag solidification temperature.

The flux cored wires of this sort have the following problems: (1) It is difficult to use them especially in an all-position welding operation including the overhead position and to secure satisfactory operability in all of the welding positions; (2) The dribbling of molten metal can be suppressed by increasing the contents of the slag-forming components in the wire to produce a large amount of slag as in covered welding, but such an increase of the contents of slag-forming components causes a marked degradation in the X-ray property; (3) The welding conditions have to be changed depending upon the welding position, e.g., in vertical and overhead positions in which high current welding is infeasible, coupled with the difficulty of downward welding in vertical position due to the necessity of weaving.

In order to solve these problems, the inventor has conducted an intensive study to find an optimum wire composition through optimization of the amount of slag production, solidification temperature and viscosity from the standpoint of maintaining excellent arc stability and concentration over a broad range of welding conditions, especially in consideration of the differences in optimum physical properties of the slag between the overhead and downhand welding positions.

The present invention has been achieved based on the finding that the above-discussed problems are solved by the use of a flux of a $TiO_2$-$Al_2O_3$ system which contains $Al_2O_3$ as a major component and which is rich in $TiO_2$, securing an optimum balance of $TiO_2$, $Al_2O_3$, $SiO_2$ and/or $ZrO_2$ components and restricting the amounts of metal fluorides, and optionally adding Ti or restricting the amounts of the slag-forming agent and ($Al_2O_3$+$SiO_2$+$ZrO_3$).

Namely, in accordance with the present invention, there is provided a flux cored wire for use in stainless steel welding, the wire having a flux filled in a stainless steel sheath, the flux containing, on the basis of the total weight of the wire, 4.7–8.5% of $TiO_2$, 0.5–3.5% of $Al_2O_3$ and 0.6–3.0% of $SiO_2$ and/or $ZrO_2$ in proportions satisfying the following formula $$TiO_2 > Al_2O_3 + SiO_2 + ZrO_2$$

and further 0.02–0.25% of metal fluoride (in terms of F conversion value) and 0.1–1.0% of Ti.

In accordance with another aspect of the invention, the flux contains slag-forming components in the range of 8.5–13.5% and in proportions satisfying the following formula $$Al_2O_3 + SiO_2 + ZrO_2 \leq 5.0\%.$$

The above and other objects, features and advantages of the invention will become apparent from the following particular description and the appended claims, taken in conjunction with the accompanying drawing.

PARTICULAR DESCRIPTION OF THE INVENTION

Figure 1A:
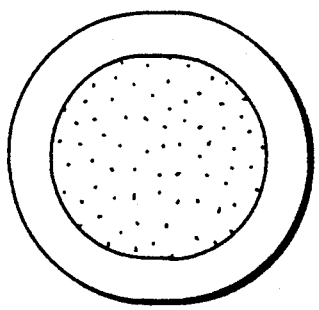
FIGS. 1(a) to 1(d) are sectional views exemplifying a number of flux cored wires.
Figure 1B:
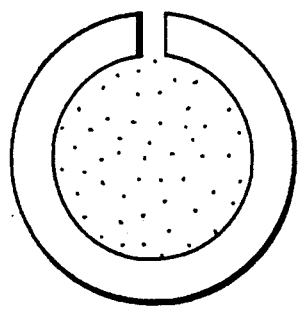
Figure 1C:
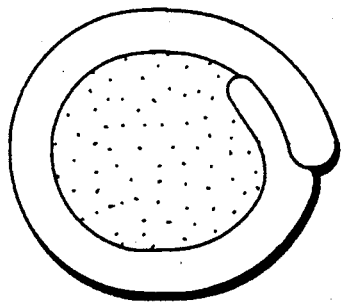
Figure 1D:
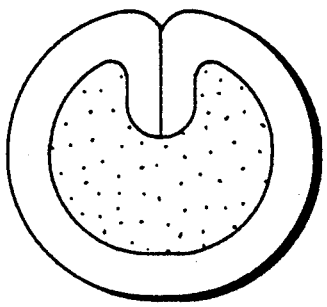

According to the invention, the respective flux components are contained respectively in the above-mentioned restricted ranges for the reasons as follows. In this regard, it is important to note that the desired effect or effects which are discussed below are produced not by one flux component alone but synergistically by a number of components which are incorporated into the flux composition in balanced proportions.

(1) Optimization of $TiO_2$, $Al_2O_3$, $SiO_2$ & $ZrO_2$ Contents $TiO_2$ as a slag-forming component has the effects of improving slag covering and slag defoliation and as an arc stabilizing agent has the effects of improving the concentration of the arc and suppressing spattering. However, a $TiO_2$ content less than 4.7% is insufficient to secure these effects, while its content in excess of 8.5% will conversely invite deteriorations in slag covering, impairing the bead appearance and X-ray property. Accordingly, the content of $TiO_2$ should be in the range of 4.7–8.7% based on the total weight of the wire, preferably in the range of 5.8–8.2%.

$Al_2O_3$ is a major component of the flux system according to the invention, and as a slag-forming component has an effect of raising the slag solidification temperature without changing its viscosity, along with an effect of improving the slag defoliation. MgO and $ZrO_2$ also serve to raise the solidification temperature but they are not suitable as a major component in consideration of the variation in slag viscosity which would be brought about by them. An $Al_2O_3$ content less than 0.5% is insufficient to obtain the desired effects, while a content in excess of 3.5% will result in defective X-ray property. Consequently, the content of $Al_2O_3$ should be in the range of 0.5–3.5% based on the total weight of the wire, preferably in the range of 0.7–2.7%.

$SiO_2$ and $ZrO_2$ which as a slag-forming component have the effects of improving the slag covering and raising the slag viscosity to ameliorate the bead shape, and are added solely or jointly. A content of $SiO_2$ and $ZrO_2$ smaller than 0.6% is insufficient to obtain the intended effects, while a content in excess of 3.2% will result in a bead of a defective convex shape and deteriorated X-ray property. Accordingly, the content of $SiO_2$ and/or $ZrO_2$ should be in the range of 0.6–3.2% based on the total weight of the wire, preferably in the range of 1.0–3.0%.

The above-described flux components, however, should be added in proportions satisfying the condition of the following formula $$TiO_2 > Al_2O_3 + SiO_2 + ZrO_2$$

It is essential to comply to this condition for optimization of the slag solidification temperature and viscosity, improving the arc stability and concentration and broadening the range of appropriate conditions to permit all-position welding operations without changing wires or decreasing the current.

(2) Metal Fluorides

The metal fluoride is an essential component for improving the anti-porous property (X-ray property), and has an effect of adjusting the fluidity of the slag. It is important to determine the additive amount of the metal fluoride in such a manner as to balance other slag-forming components such as $TiO_2$. A metal fluoride content less than 0.02% is insufficient for securing the intended effects, while its content in excess of 0.25% will result in increased amounts of hume and spatters. Accordingly, the content of the metal fluoride should be in the range of 0.02–0.25% in terms of the value of F-conversion based on the total weight of the wire, preferably in the range of 0.02–0.15% from the standpoint of the welding operability (especially the slag covering).

(3) Addition of Ti

As an arc stabilizer, Ti has the effects of improving the arc concentration and reducing the spattering. In addition, as a deoxidizer Ti has the effect of improving the X-ray property.

More importantly, Ti which is in an easily fusible form acts as a slag-forming agent through molten oxidation.

Namely, in case of a FCW with an excessive content of an oxide slag-forming component, the welding current flows only through the sheath portion of the wire, delaying the meltdown of the inner flux which has a higher melting point than the metal of the sheath portion and as a result gives rise to unmelted flux residues which deteriorate the X-ray property. Accordingly, the content of the slag-forming components in the wire has a limit. On the other hand, in order to prevent dribbling of molten metal in vertical and overhead welding positions, the slag-forming components need to be added in a large amount. According to the invention, in order to solve this problem, the wire of the invention incorporates $TiO_2$ and $Al_2O_3$ in appropriate balanced proportions which will be free of unmelted residues, while adding $TiO_2$ as a major component in a metal form which will reduce unmelted residues. Easily meltable Ti forms $TiO_2$ through molten oxidation, taking part in the slag production to prevent dribbling of molten metal. However, a Ti content less than 0.1% is insufficient to secure the desired effects, while a Ti content in excess of 1.0% will increase spattering in the downhand welding position and result in a defective bead shape and an undercut.

Therefore, the Ti content should be in the range of 0.1–1.0% based on the total weight of the wire, preferably in the range of 0.3–0.8%. Ti may be added in the form of a metal titanium or ferrotitanium.

Although the invention has been described with regard to its essential points, it is desirable to add the following restrictions, if necessary, for broadening the range of applicable conditions in all welding positions, especially in vertical and overhead welding positions, and for realizing welding operations in a higher current region.

(4) Contents of Slag-Forming Components & ($Al_2O_3+SiO_2+ZrO_3$)

The content of the slag-forming components needs to be 8.5% or larger in order to prevent dribbling of molten metal. However, unmelted residues of the slag-forming components occur if its content is larger than 13.5%, impairing the X-ray property. Accordingly, the content of the slag-forming agent should be in the range of 8.5-13.5% based on the total weight of the wire, preferably in the range of 9.0-13.5%.

Further, from the standpoint of the arc stability and concentration in a high current region and improvement of the X-ray property, it is desirable to hold the content of ($Al_2O_3+SiO_2+ZrO_2$) to 5.0% or less based on the total weight of the wire, preferably in the range of 1.1-5.0%.

Further, in view of the importance of the arc concentration (intensity) especially in vertical and overhead welding of thin plates, it is desirable to adjust the ratio of Ti/F (converted) to a value greater than 3.8, inclusive. By so doing, the "impingement" of molten droplets becomes stronger at a given current level especially in the overhead welding position, permitting straight wire motions and ensuring excellent welding operability. On the contrary, if the ratio of Ti/F exceeds 30, the intensification of the arc impingement which is obtained in the vertical and overhead welding positions becomes too strong in the downhand position and causes spattering to an objectionable degree. Therefore, the ratio of Ti/F should be smaller than 30.

With regard to optional additives other than the components mentioned above, suitable amounts of the following substances may be added provided that substantially they do not contain $CO_2$ or a carbonate.

Namely, the flux may be added with suitable amounts of: MgO, MnO or the like for fine adjustment of the physical properties of the slag; $Bi_2O_3$ for improving the slag defoliation; Na or K for improving the arc stability; and Ni, Cr, Mo, Mn, Si, Nb, C, N, Fe, Al, V, W, Cu or the like for adjustment of the weld metal composition.

The metal sheath of the wire is of a stainless steel which is subject to no particular restrictions with regard to its composition and has a composition determined depending upon the purpose of use. For example, it may be a ferritic or austenitic stainless steel. There are no restrictions on the sectional shape of the wire, which may be of any one of the shapes exemplified in FIG. 1.

Hereafter, the invention is illustrated more particularly by the following Examples.

Examples

The flux cored wires of Tables 2 and 3 were produced by the use of 0.7 mm(t)×12 mm(w) stainless steel sheaths of the chemical compositions shown in Table 1. In these tables, the contents of the flux components are indicated by percentage in the total weight of the wire, and the contents of metal fluoride are indicated in terms of the F conversion values.

The respective wires were examined by a welding test in various positions under the conditions shown in Table 4.

Figure 2:
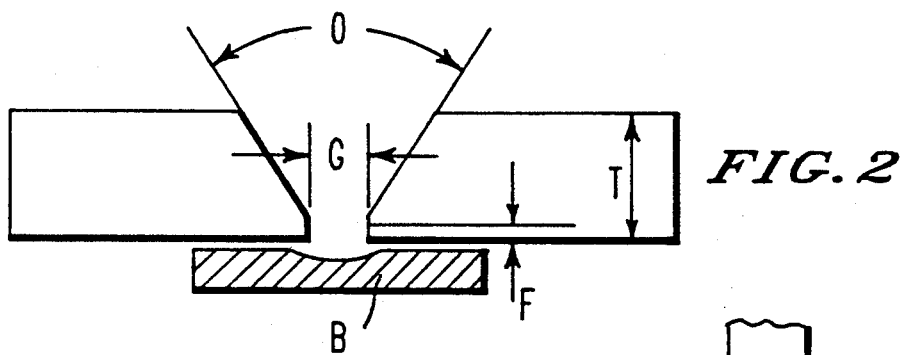
FIGS. 2 and 3 are diagrammatic views of the shapes of joints employed in Examples which will appear hereinlater.
Figure 3:
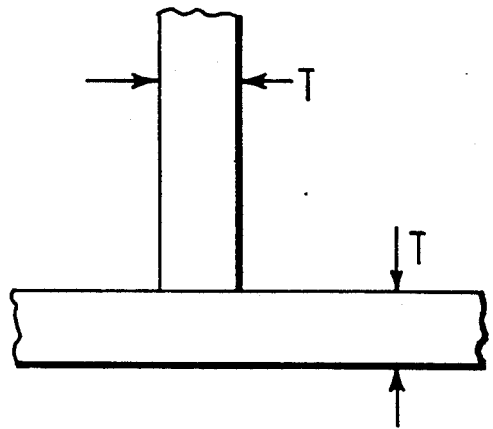

The welding test was conducted by way of a welding operation including downhand, vertical and overhead positions for a butt joint as shown in FIG. 2, and a horizontal fillet welding operation as shown in FIG. 3. In case of the joint of FIG. 2, the test was conducted by way of multi-pass welding using a backing B, plates with a thickness T of 16 mm, a bevel angle $\theta$ of 60°, a route face F of 1 mm, and a route gap G of 3 mm. In case of the joint of FIG. 3, the test was conducted by way of 1-pass welding using plates with a thickness T.

The plates used in the tests were stainless steel plates as prescribed in JIS G4304 or G4305 and of a composition similar to the wires used.

The results of the welding tests are shown in Tables 5 and 6, in which the assessment of the operation quality is indicated by ⊚ (extremely good), ○ (good), Δ (a little defective) and x (defective), and the assessment of the X-ray property was conducted according to JIS Z 3106.

As is clear from Table 6, the examples of the invention are all capable of welding in all positions and possess excellent operation quality along with satisfactory X-ray property.

On the other hand, the Comparative Examples shown in Table 5 are mostly unsatisfactory for all-position welding, and the X-ray property is inferior even if the operation quality of all-position welding is satisfactory (No. 9).

TABLE 1

| Chemical Composition of Sheath Metal | | | | | | | |
|---|---|---|---|---|---|---|---|
| Metals | | | | | | | |
| C | Si | Mn | P | S | Ni | Cr | Mo |
| A 0.010 | 0.48 | 1.04 | 0.021 | 0.004 | 10.03 | 19.25 | — |
| B 0.014 | 0.52 | 0.93 | 0.025 | 0.008 | 12.46 | 17.58 | 2.13 |
| C 0.009 | 0.36 | 0.83 | 0.016 | 0.010 | 0.17 | 17.39 | — |

TABLE 4

| Welding Conditions | | | | |
|---|---|---|---|---|
| | Welding positions | | | |
| Welding Conditions | Downhand | Vertical | Overhead | Horizontal Fillet |
| Current (A) | 200 | 200 | 200 | 200 |
| Voltage (V) | 28 | 28 | 28 | 28 |
| Speed (cm/min) | 25-30 | 6-9 | 25-30 | 35 |

Note)
Wire diam.: 1.2 mm
Power source: DC-EP
Shielding as: $CO_2$, 20 l/min

TABLE 2

| | Wire No. | | | | | | | | | |
|---|---|---|---|---|---|---|---|---|---|---|
| | 1 | 2 | 3 | 4 | 5 | 6 | 7 | 8 | 9 | 10 |
| | Metal Sheath | | | | | | | | | |
| | A | B | A | A | A | A | C | A | A | A |
| Flux Composition | | | | | | | | | | |
| Slag-forming components | | | | | | | | | | |
| $TiO_2$ | 0.8 | 8.1 | 5.5 | 8.9 | 6.0 | 7.9 | 4.2 | 6.7 | 7.1 | 5.8 |
| $Al_2O_3$ | — | 0.3 | 1.0 | 2.2 | 0.7 | 3.8 | 0.9 | 2.5 | 1.5 | 1.7 |
| $SiO_2$ | 3.1 | 0.7 | 1.6 | 1.2 | 1.8 | 2.2 | 1.8 | — | 0.5 | 1.2 |
| $ZrO_2$ | 2.3 | 1.0 | 1.8 | — | 1.1 | 0.7 | 1.2 | 0.4 | 0.5 | — |
| $Al_2O_3 + SiO_2 + ZrO_2$ | 5.4 | 2.0 | 4.4 | 3.4 | 3.6 | 6.7 | 3.9 | 2.9 | 2.5 | 2.9 |

TABLE 2-continued

|  | Wire No. | | | | | | | | | |
|---|---|---|---|---|---|---|---|---|---|---|
|  | 1 | 2 | 3 | 4 | 5 | 6 | 7 | 8 | 9 | 10 |
|  | | | | | Metal Sheath | | | | | |
|  | A | B | A | A | A | A | C | A | A | A |
| Metal fluorides | | | | | | | | | | |
| $K_2SiF_6$ | — | 0.20 | — | — | — | 0.07 | — | 0.17 | — | — |
| NaF | 0.05 | — | — | 0.07 | 0.16 | — | — | — | 0.01 | 0.07 |
| $Na_3AlF_6$ | — | — | 0.15 | — | 0.13 | — | 0.07 | — | — | — |
| MgO | — | — | — | — | — | — | — | — | — | — |
| MnO | — | — | — | — | — | — | — | — | — | — |
| $Na_2O$ | 0.14 | — | 0.15 | 0.21 | 0.37 | 0.05 | 0.06 | — | 0.02 | 0.09 |
| $K_2O$ | 0.06 | 0.20 | — | 0.05 | 0.12 | 0.10 | — | 0.14 | — | — |
| $Bi_2O_3$ | 0.05 | — | 0.10 | 0.05 | 0.05 | — | 0.05 | 0.05 | 0.05 | 0.05 |
| Total | 6.5 | 10.5 | 10.3 | 12.7 | 10.4 | 14.8 | 8.3 | 10.0 | 9.7 | 8.9 |
| Metal Components | | | | | | | | | | |
| Ti (100%) | — | — | — | — | — | 0.2 | 0.2 | — | — | — |
| Fe-40% Ti | — | 0.5 | 0.08 | 0.6 | 0.8 | 0.3 | — | 0.5 | 0.5 | 1.2 |
| Ni | 1.7 | 1.7 | 1.4 | 3.3 | 1.4 | 0.9 | 8.7 | 3.7 | 1.4 | 1.5 |
| Cr | 4.8 | 5.2 | 4.0 | 3.5 | 4.0 | 3.0 | 5.6 | 4.0 | 4.1 | 4.3 |
| Mo | — | 0.5 | — | 2.0 | — | — | — | 2.0 | — | — |
| Si | — | — | — | 0.2 | — | 0.2 | — | — | — | 0.2 |
| Mn | 1.2 | 1.2 | 1.2 | 1.2 | 1.2 | 1.2 | 1.2 | 1.2 | 1.2 | 1.2 |
| Fe | 9.8 | 4.4 | 7.5 | 0.5 | 6.1 | 3.3 | — | 2.6 | 7.1 | 6.6 |
| Ti/F | 0 | 2.5 | 0.5 | 8.6 | 2.8 | 7.1 | 2.9 | 2.9 | 50 | 17.1 |
| Remarks | | | | | Comparative Examples | | | | | |

Note 1:
The metal fluoride contents are indicated by F-conversion values.
Note 2:
Ti contents in "Fe-40% Ti" are indicated by Ti-conversion values.

TABLE 3

|  | Wire No. | | | | | | | | | |
|---|---|---|---|---|---|---|---|---|---|---|
|  | 11 | 12 | 13 | 14 | 15 | 16 | 17 | 18 | 19 | 20 |
|  | | | | | Metal Sheath | | | | | |
|  | A | A | C | A | A | A | B | A | A | A |
| Flux Composition | | | | | | | | | | |
| Slag-forming components | | | | | | | | | | |
| $TiO_2$ | 8.2 | 7.9 | 4.9 | 6.3 | 5.7 | 7.1 | 8.3 | 6.9 | 5.2 | 7.4 |
| $Al_2O_3$ | 3.0 | 3.3 | 2.1 | 0.7 | 2.5 | 1.6 | 2.6 | 2.1 | 1.5 | 2.3 |
| $SiO_2$ | 2.9 | — | 0.5 | 0.3 | 1.6 | — | 0.9 | 0.9 | 1.2 | 0.5 |
| $ZrO_2$ | — | 2.0 | 0.3 | 0.4 | 1.3 | 0.7 | — | 1.0 | 1.1 | 0.5 |
| $Al_2O_3 + SiO_2 + ZrO_2$ | 5.9 | 5.3 | 2.9 | 1.4 | 5.4 | 2.3 | 3.5 | 4.0 | 3.8 | 3.3 |
| Metal fluorides | | | | | | | | | | |
| $K_2SiF_6$ | 0.09 | — | 0.22 | — | — | — | 0.17 | — | — | — |
| NaF | — | 0.04 | — | — | 0.04 | 0.07 | — | 0.07 | 0.07 | 0.05 |
| $Na_3AlF_6$ | — | — | — | 0.15 | 0.04 | — | — | — | — | 0.05 |
| MgO | — | — | — | 0.2 | — | — | — | — | — | 0.2 |
| MnO | — | — | — | — | 0.2 | — | — | — | 0.2 | — |
| $Na_2O$ | — | 0.07 | — | 0.10 | 0.15 | 0.12 | — | 0.12 | 0.07 | 0.12 |
| $K_2O$ | — | — | 0.04 | 0.10 | 0.04 | — | 0.14 | 0.14 | — | 0.14 |
| $Bi_2O_3$ | — | — | 0.05 | 0.05 | 0.05 | 0.05 | 0.05 | 0.05 | 0.05 | 0.05 |
| Total | 14.2 | 13.3 | 8.1 | 8.3 | 11.6 | 9.6 | 12.1 | 11.3 | 9.4 | 11.3 |
| Metal Components | | | | | | | | | | |
| Ti (100%) | — | 0.3 | — | — | 0.2 | — | 0.9 | — | — | — |
| Fe-40% Ti | 0.3 | — | 0.8 | 0.5 | 0.5 | 0.3 | — | 0.5 | 0.7 | 0.9 |
| Ni | 1.0 | 1.1 | 8.5 | 3.9 | 1.2 | 0.4 | 1.5 | 1.3 | 3.7 | 1.3 |
| Cr | 3.2 | 3.4 | 5.3 | 4.4 | 3.7 | 4.1 | 4.9 | 3.8 | 4.2 | 3.8 |
| Mo | — | — | — | 2.1 | — | — | 0.4 | — | 2.0 | — |
| Si | — | — | — | — | 0.2 | — | — | 0.2 | — | 0.2 |
| Mn | 1.2 | 1.2 | 1.2 | 1.2 | 1.2 | 1.2 | 1.2 | 1.2 | 1.2 | 1.2 |
| Fe | 4.1 | 4.6 | — | 3.6 | 5.3 | 8.4 | 3.4 | 5.7 | 2.6 | 5.4 |
| Ti/F | 3.3 | 7.5 | 3.6 | 3.3 | 8.8 | 4.3 | 5.3 | 7.1 | 10.0 | 9.0 |
| Remarks | | | | | Examples of Invention | | | | | |

Note 1:
The metal fluoride contents are indicated by F-conversion values.
Note 2:
Ti contents in "Fe-40% Ti" are indicated by Ti-conversion values.

TABLE 5

|  | Wire No. | | | | | | | | | |
|---|---|---|---|---|---|---|---|---|---|---|
|  | 1 | 2 | 3 | 4 | 5 | 6 | 7 | 8 | 9 | 10 |
| Operability | | | | | | | | | | |
| All Positions | | | | | | | | | | |
| Arc stability | Δ | ○ | ○ | ○ | ○ | Δ | Δ | ○ | ○ | ○ |
| Arc concentration | X | ○ | ○ | ○ | X | ○ | X | ○ | ◎ | ◎ |
| Slag defoliation | X | X | Δ | ○ | ○ | ○ | Δ | ○ | ○ | ○ |

TABLE 5-continued

| | Wire No. | | | | | | | | | |
|---|---|---|---|---|---|---|---|---|---|---|
| | 1 | 2 | 3 | 4 | 5 | 6 | 7 | 8 | 9 | 10 |
| Downhand | | | | | | | | | | |
| Spattering | △ | ○ | ○ | ○ | △ | △ | × | ○ | ○ | × |
| Bead appearance | ○ | ○ | ○ | × | ○ | △ | ○ | △ | ○ | ○ |
| Bead shape (solidified state of deposit metal) | ○ | ○ | ○ | △ | ○ | × | ○ | △ | ○ | × |
| Vertical | | | | | | | | | | |
| Spattering | △ | ○ | △ | △ | × | × | △ | ○ | ◎ | △ |
| Bead appearance | △ | △ | △ | × | △ | △ | △ | ○ | ○ | ○ |
| Bead shape (solidified state of deposit metal) | × | × | × | ○ | × | ○ | × | × | ○ | × |
| Overhead | | | | | | | | | | |
| Spattering | × | ○ | △ | △ | × | × | × | ○ | ○ | △ |
| Bead appearance | × | × | △ | × | △ | × | × | × | ○ | ○ |
| Bead shape (solidified state of deposit metal) | × | × | × | ○ | × | ○ | × | × | ○ | △ |
| X-ray Property (Grade) | | | | | | | | | | |
| Downhand | G1 | G1 | G2 | G2 | G1 | G2 | G1 | G1 | <G3 | G2 |
| Vertical | G2 | G2 | <G3 | <G3 | G2 | <G3 | G2 | G2 | <G3 | G2 |
| Overhead | All lower than Grade 3. | | | | | | | | | |
| Overall Assessment | All Inapplicable. | | | | | | | | | |
| Remarks | Comparative Examples | | | | | | | | | |

TABLE 6

| | Wire No. | | | | | | | | | |
|---|---|---|---|---|---|---|---|---|---|---|
| | 11 | 12 | 13 | 14 | 15 | 16 | 17 | 18 | 19 | 20 |
| Operability | | | | | | | | | | |
| All Positions | | | | | | | | | | |
| Arc stability | ○ | ○ | ◎ | ◎ | ○ | ◎ | ◎ | ◎ | ◎ | ◎ |
| Arc concentration | ○ | ◎ | ○ | ○ | ◎ | ◎ | ◎ | ◎ | ◎ | ◎ |
| Slag defoliation | ○ | ○ | ○ | ◎ | ◎ | ◎ | ◎ | ◎ | ◎ | ◎ |
| Downhand | | | | | | | | | | |
| Spattering | ○ | ◎ | ○ | ○ | ◎ | ◎ | ◎ | ◎ | ◎ | ◎ |
| Bead appearance | ○ | ○ | ○ | ○ | ○ | ◎ | ◎ | ◎ | ◎ | ◎ |
| Bead shape (solidified state of deposit metal) | ○ | ○ | ○ | ○ | ○ | ◎ | ◎ | ◎ | ◎ | ◎ |
| Vertical | | | | | | | | | | |
| Spattering | ○ | ◎ | ○ | ○ | ◎ | ◎ | ◎ | ◎ | ◎ | ◎ |
| Bead appearance | ○ | ○ | ○ | ○ | ○ | ◎ | ◎ | ◎ | ◎ | ◎ |
| Bead shape (solidified state of deposit metal) | ◎ | ◎ | ○ | ○ | ◎ | ◎ | ◎ | ◎ | ◎ | ◎ |
| Overhead | | | | | | | | | | |
| Spattering | ○ | ◎ | ○ | ○ | ◎ | ◎ | ◎ | ◎ | ◎ | ◎ |
| Bead appearance | ○ | ○ | ○ | ○ | ○ | ◎ | ◎ | ◎ | ◎ | ◎ |
| Bead shape (solidified state of deposit metal) | ◎ | ◎ | ○ | ○ | ◎ | ◎ | ◎ | ◎ | ◎ | ◎ |
| X-ray Property (Grade) | | | | | | | | | | |
| Downhand | Grade 1 | | | | | | | | | |
| Vertical | C1/G1 | Grade 1 | | | | | | | | |
| Overhead | C1/G1 | C1/G1 | G1 | G1 | C1/G1 | Grade 1 | | | | |
| Overall Assessment | All Applicable | | | | | | | | | |
| Remarks | Examples of Invention | | | | | | | | | |

As is clear from the foregoing description, the present invention provides a flux cored wire suitable for use in stainless steel welding, employing a flux of a $TiO_2-Al_2O_3$ system which contains $Al_2O_3$ as a major component and which is rich in $TiO_2$, securing appropriate balancing of $TiO_2$, $Al_2O_3$, $SiO_2$ and/or $ZrO_2$ contents and restricting the content of a metal fluoride, or additionally adding Ti or restricting the contents of slag-forming agent and ($Al_2O_3 + SiO_2 + ZrO_2$), to permit all-position welding including the overhead position without changing the welding condition from one position to another while ensuring excellent welding operation quality to produce a weld metal with favorable X-ray property. Besides, the wire of the invention has advantages that the vertical and overhead position welding operations are feasible with the same high current as in the downhand position, and straight wire feed is possible in upward or downward welding operations in vertical position, permitting formation of beads of short legs and application to thin plates.

What is claimed is:

1. A flux containing wire for use in stainless steel welding, said wire having a flux filled in a stainless steel sheath, said flux comprising, on the basis of the total weight of said wire, slag-forming components comprising 4.7–8.5% of $TiO_2$, 0.5–3.5% of $Al_2O_3$ and 0.6–3.2% of $SiO_2$, $ZrO_2$ or a mixture of $SiO_2$ and $ZrO_2$ in proportions satisfying the following formula:

$$TiO_2 > Al_2O_3 + SiO_2 + ZrO_2$$

and 0.02–0.25% of metal fluoride (in terms of F conversion value), 3.2–5.3% of Cr, and 0.1–1.0% of Ti, wherein said flux contains, on the basis of the total weight of said wire, said slag-forming components in the range of 8.5–13.5% and in proportions satisfying the following formula:

$$Al_2O_3 + SiO_2 + ZrO_2 \leq 2.0\%$$

2. A flux containing wire as defined in claim 1, wherein said flux contains 5.8–8.2% of $TiO_2$ based on the total weight of said wire.

3. A flux containing wire as defined in claim 1, wherein said flux contains 0.7–2.7% of $Al_2O_3$ based on the total weight of said wire.

4. A flux containing wire as defined in claim 1, wherein said flux comprises 1.0–3.0% of $SiO_2$, $ZrO_2$ or a mixture of $SiO_2$ and $ZrO_2$ based on the total weight of said wire.

5. A flux containing wire as defined in claim 1, wherein said flux contains 0.02–0.15% of metal fluoride in F-conversion value, based on the total weight of said wire.

6. A flux containing wire as defined in claim 1, wherein said flux contains 0.3–0.8% of Ti based on the total weight of said wire.

7. A flux containing wire as defined in claim 1, wherein the ratio of Ti/F (F-conversion value) is in the range of $3.8 \leq Ti/F \leq 30$.

8. A flux containing wire as defined in claim 1, wherein said flux contains 9.0–13.5% of slag-forming components based on the total weight of said wire.

9. A flux containing wire as defined in claim 1, wherein said flux contains $Al_2O_3$, $SiO_2$ and $ZrO_2$ in the range of 1.1–5.0% based on the total weight of said wire.

* * * * *